(12) United States Patent
Evers Smith et al.

(10) Patent No.: US 8,535,466 B2
(45) Date of Patent: Sep. 17, 2013

(54) PROCESS FOR MAKING FIBROUS STRUCTURES COMPRISING A POLYMER STRUCTURE

(75) Inventors: Linda Evers Smith, Morrow, OH (US); David William Cabell, Cincinnati, OH (US); Larry Neil Mackey, Fairfield, OH (US); Gregory Charles Gordon, Cincinnati, OH (US); Paul Dennis Trokhan, Hamilton, OH (US); Tedi-Lea Anne DeBruler, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 506 days.

(21) Appl. No.: 12/490,517

(22) Filed: Jun. 24, 2009

(65) Prior Publication Data

US 2009/0260746 A1 Oct. 22, 2009

Related U.S. Application Data

(62) Division of application No. 11/411,333, filed on Apr. 26, 2006, now Pat. No. 7,572,504.

(60) Provisional application No. 60/687,043, filed on Jun. 3, 2005.

(51) Int. Cl.
*D04H 3/14* (2012.01)
(52) U.S. Cl.
USPC .................................................. 156/181
(58) Field of Classification Search
USPC .................................................. 156/181
See application file for complete search history.

(56) References Cited

U.S. PATENT DOCUMENTS

| 3,655,644 | A |   | 4/1972  | Muscatine |
|-----------|---|---|---------|-----------|
| 3,855,046 | A | * | 12/1974 | Hansen et al. ............ 428/198 |
| 5,328,565 | A |   | 7/1994  | Rasch et al. |
| 5,342,225 | A |   | 8/1994  | Farr |
| 5,575,891 | A |   | 11/1996 | Trokhan et al. |
| 5,843,279 | A |   | 12/1998 | Phan et al. |
| 6,623,854 | B2 |  | 9/2003  | Bond |
| 6,670,470 | B1 |  | 12/2003 | Ketola et al. |
| 6,743,506 | B2 |  | 6/2004  | Bond et al. |
| 6,783,854 | B2 |  | 8/2004  | Bond |
| 6,830,810 | B2 |  | 12/2004 | Bond |

(Continued)

FOREIGN PATENT DOCUMENTS

EP 1132427 A1 9/2001
EP 1035239 B1 5/2005

(Continued)

OTHER PUBLICATIONS

Geffroy, et al., "A: Physicochemical and Engineering Aspects", *Colloids and Surfaces*, vol. 162, pp. 107-121 (2000).
Othmer, *Encyclopedia of Chemical Technology*, 4th Edition, vol. 22, pp. 699-719.

(Continued)

*Primary Examiner* — Michael Tolin
(74) *Attorney, Agent, or Firm* — C. Brant Cook

(57) ABSTRACT

Polymer structures and methods for making such polymer structures are provided. More particularly, polymer structures comprising a hydroxyl polymer structure, such as a fiber comprising a hydroxyl polymer are provided. Even more particularly, fibrous structures comprising a hydroxyl polymer structure, such as a fiber comprising a hydroxyl polymer, wherein the fibrous structure exhibits a CETM Factor of less than 20 and/or a CETM*$L^2$ Factor of less than 950 are provided.

10 Claims, 6 Drawing Sheets

(56) References Cited

U.S. PATENT DOCUMENTS

| | | |
|---|---|---|
| 6,890,872 B2 | 5/2005 | Bond et al. |
| 6,977,116 B2 * | 12/2005 | Cabell et al. ............... 428/373 |
| 7,025,821 B2 | 4/2006 | Mackey et al. |
| 2003/0109605 A1 * | 6/2003 | Bond et al. ................... 524/47 |
| 2005/0126728 A1 * | 6/2005 | Beuther et al. ............. 162/109 |
| 2006/0275347 A1 | 12/2006 | Evers Smith |
| 2007/0039704 A1 * | 2/2007 | Cabell et al. ............ 162/157.2 |
| 2009/0022983 A1 | 1/2009 | Cabell et al. |

FOREIGN PATENT DOCUMENTS

| | | |
|---|---|---|
| EP | 1217107 B1 | 5/2005 |
| EP | 1217106 B1 | 11/2005 |
| WO | WO 03/066942 A1 | 8/2003 |
| WO | WO 03/097701 A1 | 11/2003 |

OTHER PUBLICATIONS

Pourdeyhimi, et al., "Measuring Fiber Diameter Distribution in Nonwovens", *Textile Res. J.*, 69(4), pp. 233-236 (1999).

\* cited by examiner

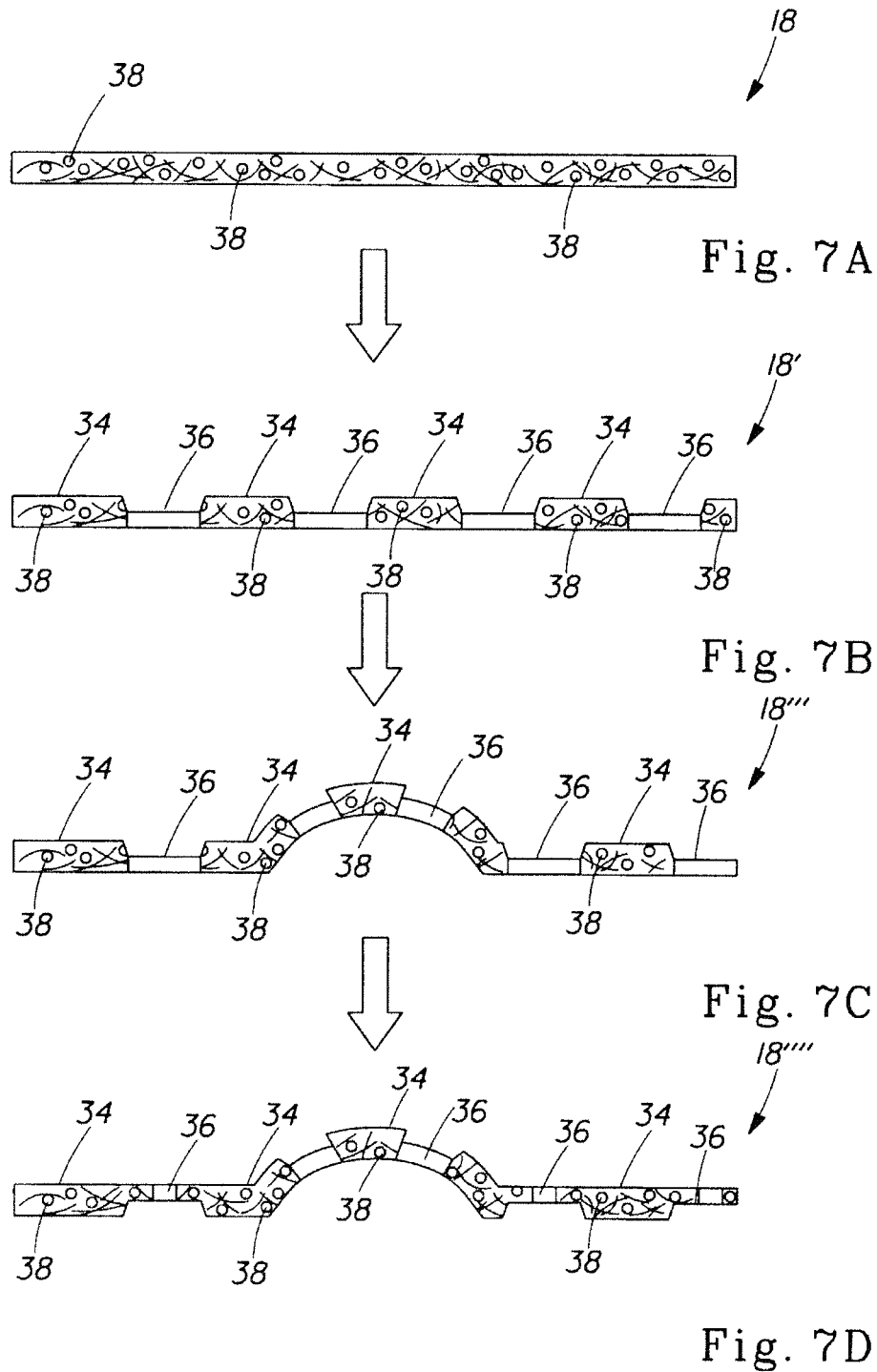

US 8,535,466 B2

PROCESS FOR MAKING FIBROUS STRUCTURES COMPRISING A POLYMER STRUCTURE

CROSS REFERENCE TO RELATED APPLICATIONS

This application is a divisional of prior U.S. application Ser. No. 11/411,333 filed Apr. 26, 2006, now U.S. Pat. No. 7,572,504, which claims the benefit of U.S. Provisional Application No. 60/687,043 filed Jun. 3, 2005.

FIELD OF THE INVENTION

The present invention relates to polymer structures and methods for making such polymer structures. More particularly, the present invention relates to polymer structures comprising a hydroxyl polymer structure, such as a fiber comprising a hydroxyl polymer. Even more particularly, the present invention relates to fibrous structures comprising a hydroxyl polymer structure, such as a fiber comprising a hydroxyl polymer, wherein the fibrous structure exhibits a CETM Factor of less than 20 and/or a CETM*$L^2$ Factor of less than 950.

BACKGROUND OF THE INVENTION

Fibrous structures that exhibit a CETM Factor of 21 or greater and/or a CETM*$L^2$ Factor of greater than 1000 are known in the art. For example, fibrous structures that comprise a fiber comprising a hydroxyl polymer that exhibit a CETM Factor of 21 or greater and/or that exhibit a CETM*$L^2$ Factor of greater than 1000 are known in the art.

It is known that sanitary tissue products comprising a fibrous structure that exhibits a CETM Factor of 21 or greater and/or that exhibits a CETM*$L^2$ Factor of greater than 1000 do not exhibit consumer acceptable properties such as linting and/or pilling, especially wet linting and/or wet pilling, dry linting and/or dry pilling, and/or softness.

Accordingly, there is a need for a fibrous structure that exhibits a CETM Factor of less than 20 and/or a CETM*$L^2$ Factor of less than 950; methods for making such fibrous structures and sanitary tissue products comprising such fibrous structures.

SUMMARY OF THE INVENTION

The present invention fulfills the needs described above by providing a fibrous structure that exhibits a CETM Factor of less than 20 and/or a CETM*$L^2$ Factor of less than 950.

In one example of the present invention, a fibrous structure comprising a hydroxyl polymer structure, such as a hydroxyl polymer fiber and/or film and/or foam, wherein the fibrous structure exhibits a CETM Factor of less than 20 is provided.

In another example of the present invention, a fibrous structure comprising a hydroxyl polymer structure, such as a hydroxyl polymer fiber and/or film and/or foam, wherein the fibrous structure exhibits a CETM*$L^2$ Factor of less than 950 is provided.

In even another example of the present invention, a process for making a fibrous structure comprising a hydroxyl polymer structure, wherein the fibrous structure exhibits a CETM Factor of less than 20 and/or a CETM*$L^2$ Factor of less than 950, the process comprising the steps of:

a. producing a hydroxyl polymer structure in the form of a fiber;

b. forming a fibrous structure comprising the hydroxyl polymer fiber;

c. subjecting the fibrous structure to a thermal bonding operation, is provided.

In even still yet another example of the present invention, a single- or multi-ply sanitary tissue product comprising a fibrous structure of the present invention is provided.

Accordingly, the present invention provides fibrous structures that exhibits a CETM Factor of less than 20 and/or a CETM*$L^2$ Factor of less than 950; methods for making such a fibrous structure and sanitary tissue products comprising such a fibrous structure; and processes for making a fibrous structure of the present invention.

BRIEF DESCRIPTION OF THE DRAWINGS

FIG. 7 is a flowchart representing in schematic cross-sectional representation of examples of fibrous structures formed according to the processes of the present invention;

DETAILED DESCRIPTION OF THE INVENTION

Definitions

Figure 1A:
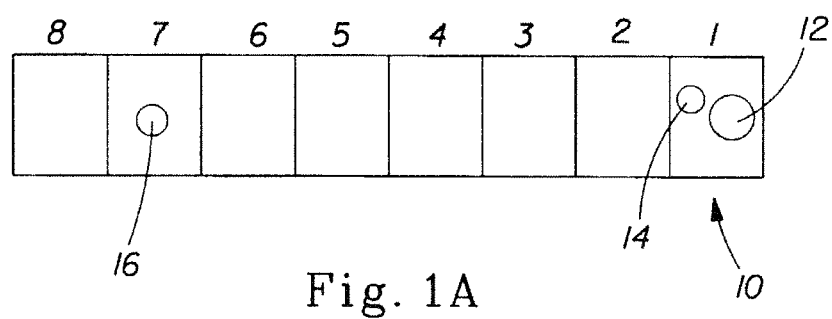
FIG. 1A is a schematic representation of a side view of a barrel of a twin screw extruder suitable for use in the present invention.

"Polymer structure" as used herein means any single physical structure produced by a polymer or polymer composition comprising at least one polymer. The polymer structures are produced from a polymer composition that is polymer processed into the physical structure. The polymer structures may be dry spun and/or solvent spun. "Dry spinning", "dry spun" and/or "solvent spinning", "solvent spun" as used herein unlike wet spinning means that polymer structures are not spun into a coagulating bath.

The polymer structures of the present invention are non-naturally occurring polymer structures. In other words, the polymer structures of the present invention do not include naturally occurring cellulose fibers. Nonlimiting examples of polymer structures in accordance with the present invention include fibers, films and foams. A plurality of polymer structure fibers may combine to form a fibrous structure (web).

The polymer structures of the present invention may be combined with other non-polymer structure physical structures, such as naturally occurring cellulose fibers, to form a fibrous structure. In one example, the polymer structure of the present invention as a whole (fiber, fibrous structure, film and/or foam) has no melting point. It is also desirable that the polymer structure (fiber, fibrous structure, film and/or foam) of the present invention be substantially homogeneous or completely homogeneous.

In one example, the polymer structures of the present invention do not contain water-insoluble thermoplastic polymers.

In another example, the polymer structures of the present invention do not consist of inherently thermoplastic polymers.

In yet another example, the polymer structures of the present invention do not contain non-hydroxyl-containing thermoplastic polymers.

The polymer structures of the present invention, especially fibers of the present invention, may be produced by crosslinking polymers, such as hydroxyl polymers, together. Nonlimiting examples of a suitable crosslinking system for achieving crosslinking comprises a crosslinking agent and optionally a crosslinking facilitator, wherein the hydroxyl polymer is crosslinked by the crosslinking agent.

A "fibrous structure" as used herein means a single web structure that comprises at least one fiber. For example, a fibrous structure of the present invention may comprise one or more fibers, wherein at least one of the fibers comprises a hydroxyl polymer structure in fiber form. In another example, a fibrous structure of the present invention may comprise a plurality of fibers, wherein at least one (sometimes a majority, even all) of the fibers comprises a hydroxyl polymer structure in fiber form. The fibrous structures of the present invention may be layered such that one layer of the fibrous structure may comprise a different composition of fibers and/or materials from another layer of the same fibrous structure.

Polymer structures of the present invention do not include coatings and/or other surface treatments comprising a hydroxyl polymer (such as starch sizing compositions) that are applied to a pre-existing form, such as a coating on a fiber, film or foam. However, in one embodiment of the present invention, a polymer structure in accordance with the present invention may be coated and/or surface treated with the crosslinking system of the present invention.

The polymer structures in fiber, fibrous structure, film and/or foam form may be incorporated into sanitary tissue products and/or other paper-like products, such as writing papers, cores, such as tissue product cores, packaging films, and packaging peanuts.

One or more polymer structures of the present invention may be incorporated into a multi-polymer structure product.

"Hydroxyl polymer structure" as used herein means a polymer structure of the present invention wherein the polymer structure comprises a hydroxyl polymer.

"Hydroxyl polymer" as used herein includes any hydroxyl-containing polymer that can be incorporated into a polymer structure of the present invention, such as into a polymer structure in the form of a fiber.

In one embodiment, the hydroxyl polymer of the present invention includes greater than 10% and/or greater than 20% and/or greater than 25% by weight hydroxyl moieties.

Nonlimiting examples of hydroxyl polymers in accordance with the present invention include polyols, such as polyvinyl alcohol, polyvinyl alcohol derivatives, polyvinyl alcohol copolymers, starch, starch derivatives, chitosan, chitosan derivatives, cellulose derivatives such as cellulose ether and ester derivatives, gums, arabinans, galactans, proteins and various other polysaccharides and mixtures thereof.

Classes of hydroxyl polymers are defined by the hydroxyl polymer backbone. For example polyvinyl alcohol and polyvinyl alcohol derivatives and polyvinyl alcohol copolymers are in the class of polyvinyl alcohol hydroxyl polymers whereas starch and starch derivatives are in the class of starch hydroxyl polymers.

The hydroxyl polymer may have a weight average molecular weight of from about 10,000 to about 40,000,000 g/mol. Higher and lower molecular weight hydroxyl polymers may be used in combination with hydroxyl polymers having the preferred weight average molecular weight.

Well known modifications of hydroxyl polymer, such as natural starches, include chemical modifications and/or enzymatic modifications. For example, the natural starch can be acid-thinned, hydroxy-ethylated, hydroxy-propylated, and/or oxidized. In addition, the hydroxyl polymer may comprise dent corn starch hydroxyl polymer.

Polyvinyl alcohols herein can be grafted with other monomers to modify its properties. A wide range of monomers has been successfully grafted to polyvinyl alcohol. Nonlimiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters.

"Polysaccharides" as used herein means natural polysaccharides and polysaccharide derivatives or modified polysaccharides. Suitable polysaccharides include, but are not limited to, starches, starch derivatives, chitosan, chitosan derivatives, cellulose derivatives, gums, arabinans, galactans and mixtures thereof. In one example, the hydroxyl polymer comprises and/or consists essentially of and/or consists of one or more polysaccharides.

"Fiber" as used herein means a slender, thin, and highly flexible object having a major axis which is very long, compared to the fiber's two mutually-orthogonal axes that are perpendicular to the major axis. Preferably, an aspect ratio of the major's axis length to an equivalent diameter of the fiber's cross-section perpendicular to the major axis is greater than 100/1, more specifically greater than 500/1, and still more specifically greater than 1000/1, and even more specifically, greater than 5000/1.

The fibers of the present invention may be continuous or substantially continuous. In one example, a fiber is continuous or substantially continuous if it extends 100% of the MD length of the fibrous structure and/or fibrous structure and/or sanitary tissue product made therefrom. In one embodiment, a fiber is substantially continuous if it extends greater than about 5% and/or greater than about 10% and/or greater than about 20% and/or greater than about 30% and/or greater than about 50% and/or greater than about 70% of the MD length of the fibrous structure and/or sanitary tissue product made therefrom. In another example, a fiber is continuous or substantially continuous if it exhibits a length of at least about 2.54 cm (1 inch) and/or at least about 3.81 cm (1.5 inches) and/or at least about 5.08 cm (2 inches) and/or at least about 6.35 cm (2.5 inches) and/or at least about 7.62 cm (3 inches).

The fiber can have a fiber diameter as determined by the Fiber Diameter Test Method described herein of less than about 50 microns and/or less than about 20 microns and/or less than about 10 microns and/or less than about 8 microns and/or less than about 6 microns and/or less than about 5.5 microns.

The fibers may include melt spun fibers, dry spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

"Sanitary tissue product" as used includes but is not limited to a wiping implement for post-urinary and post-bowel movement cleaning (toilet tissue), for otorhinolaryngological discharges (facial tissue), and multi-functional absorbent, cleaning uses (absorbent towels), wipes, feminine care products and diapers.

A sanitary tissue product of the present invention comprises at least one polymer structure and/or fibrous structure in accordance with the present invention. In one example, a polymer structure and/or a fibrous structure and/or sanitary tissue product according to the present invention exhibits an initial total wet tensile, as measured by the Initial Total Wet Tensile Test Method described herein, of at least about 8 g/2.54 cm (8 g/in) and/or at least about 10 g/2.54 cm (10 g/in) and/or at least about 15 g/2.54 cm (15 g/in) and/or at least about 20 g/2.54 cm (20 g/in) and/or at least about 40 g/2.54 cm (40 g/in).

In another example, a polymer structure and/or a fibrous structure and/or a sanitary tissue product of the present invention exhibits an initial total wet tensile, as measured by the Initial Total Wet Tensile Test Method described herein, of less than about 500 g/2.54 cm (500 g/in) and/or less than about 400 g/2.54 cm (400 g/in) and/or less than about 300 g/2.54 cm (300 g/in) and/or less than about 200 g/2.54 cm (200 g/in) and/or less than about 150 g/2.54 cm (150 g/in) and/or less than about 120 g/2.54 cm (120 g/in) and/or less than about 100 g/2.54 cm (100 g/in).

In yet another example, polymer structure and/or a fibrous structure and/or a sanitary tissue product of the present invention may exhibit an initial total wet tensile, as measured by the Initial Total Wet Tensile Test Method described herein, of from about 8 g/2.54 cm (8 g/in) to about 500 g/2.54 cm (500 g/in) and/or from about 40 g/2.54 cm (40 g/in) to about 500 g/2.54 cm (500 g/in) and/or from about 60 g/2.54 cm (60 g/in) to about 500 g/2.54 cm (500 g/in) and/or from about 65 g/2.54 cm (65 g/in) to about 450 g/2.54 cm (450 g/in) and/or from about 70 g/2.54 cm (70 g/in) to about 400 g/2.54 cm (400 g/in) and/or from about 75 g/2.54 cm (75 g/in) to about 400 g/2.54 cm (400 g/in) and/or from about 80 g/2.54 cm (80 g/in) to about 300 g/2.54 cm (300 g/in) and/or from about 80 g/2.54 cm (80 g/in) to about 200 g/2.54 cm (200 g/in) and/or from about 80 g/2.54 cm (80 g/in) to about 150 g/2.54 cm (150 g/in) and/or from about 80 g/2.54 cm (80 g/in) to about 120 g/2.54 cm (120 g/in) and/or from about 80 g/2.54 cm (80 g/in) to about 100 g/2.54 cm (100 g/in).

In one example, polymer structure and/or a fibrous structure and/or a sanitary tissue product according to the present invention exhibits a minimum total dry tensile of at least about 70 g/2.54 cm (70 g/in) and/or at least about 100 g/2.54 cm (100 g/in) and/or at least about 300 g/2.54 cm (300 g/in) and/or at least about 500 g/2.54 cm (500 g/in) and/or at least about 700 g/2.54 cm (700 g/in) and/or at least about 800 g/2.54 cm (800 g/in) and/or at least about 900 g/2.54 cm (900 g/in) and/or at least about 1000 g/2.54 cm (1000 g/in).

In another example, polymer structure and/or a fibrous structure and/or a sanitary tissue product according to the present invention exhibits a maximum total dry tensile of less than about 5000 g/2.54 cm (5000 g/in) and/or less than about 4000 g/2.54 cm (4000 g/in) and/or less than about 2000 g/2.54 cm (2000 g/in) and/or less than about 1700 g/2.54 cm (1700 g/in) and/or less than about 1500 g/2.54 cm (1500 g/in).

In even another example, polymer structure and/or a fibrous structure and/or a sanitary tissue product according to the present invention exhibits a wet lint score of less than about 25 and/or less than 20 and/or less than 15 and/or less than 10 as measured according to the Lint/Pilling Test Method described herein.

In yet another example, a sanitary tissue product according to the present invention exhibits a total dry tensile within a range of a minimum and maximum total dry tensile value as described above.

In still yet another example, polymer structure and/or a fibrous structure and/or a sanitary tissue product according to the present invention exhibits a Dry Lint Score of less than about 10 and/or less than about 8 and/or less than about 7 and/or less than about 6 and/or less than about 5.5 as measured according to the Lint/Pilling Test Method described herein.

"Ply" or "Plies" as used herein means a single fibrous structure optionally to be disposed in a substantially contiguous, face-to-face relationship with other plies, forming a multi-ply sanitary tissue product. It is also contemplated that a single fibrous structure can effectively form two "plies" or multiple "plies", for example, by being folded on itself. Ply or plies can also exist as films or other polymer structures.

One or more layers may be present in a single ply. For example, two or more layers of different compositions may form a single ply. In other words, the two or more layers are substantially or completely incapable of being physically separated from each other without substantially damaging the ply.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Lint" and/or "Pills" as used herein means discrete pieces of a polymer structure and/or fibrous structure and/or sanitary tissue product that become separated from the original polymer structure and/or fibrous structure and/or sanitary tissue product, respectively, typically during use.

For example, known bath tissues and paper towels are comprised of fibrous structures consisting essentially of short cellulose fibers. During a wiping process—both wet and dry, these short cellulosic fibers can detach from the fibrous structure and become evident as lint or pills. The present invention employs essentially continuous or substantially continuous fibers vs. traditional discrete, short cellulosic fibers. Generally speaking, fibrous structures of the present invention resist linting vs. their cellulosic fiber-based cousins due to the continuous nature of the fibers of the present invention. Furthermore, polymer structures and/or fibrous structures and/or sanitary tissue products of the present invention will resist pilling vs. their cellulosic fiber-based cousins provided the bonding and fiber strength and stretch are sufficient enough to prevent free fiber breakage and entanglement with adjacent fibers during the wiping process.

"Intensive Properties" and/or "Values of Common Intensive Properties" as used herein means a property of the polymer structure, fibrous structure and/or sanitary tissue product (collectively referred to as "substrate"—which means a single, unitary structure, not multiple unitary structures stacked one on top of the other) of the present invention that is independent of mass. Nonlimiting examples of common intensive properties include density, substrate basis weight, substrate caliper, substrate thickness, substrate elevation, substrate opacity, substrate crepe frequency, and any combination thereof. The polymer structures and/or fibrous structures and/or sanitary tissue products of the present invention may comprise two or more regions that exhibit different values of common intensive properties relative to each other. In other words, a fibrous structure of the present invention may comprise one region having a first opacity value and a second region having a second opacity value different from the first opacity value. Such regions may be continuous, substantially continuous and/or discontinuous. Various common intensive properties can be measured by the methods described in U.S. Pat. No. 5,843,279 to Phan et al. and U.S. Pat. No. 5,328,565 to Rasch et al. all owned by The Procter & Gamble Company.

"Thermal bonding operation" as used herein means that a material, such as a polymer structure, especially a fibrous structure comprising a hydroxyl polymer structure according to the present invention, is imparted properties that result in one or more of the polymers of the polymer structure to exhibit a temperature above its Tg. Once the polymer is imparted a temperature above its Tg, then the polymer can flow thus facilitating fusing of fibers and/or polymer structures where a pressure is applied.

The conditions at which the thermal bonding operation occurs can vary depending upon the values of each of the conditions. For example, the following conditions are the primary conditions that impact the thermal bonding operation of a fibrous structure comprising one or more fibers formed from one or more hydroxyl polymers of the present invention: 1) level of a Tg modifying agent, such as a polyvinyl alcohol hydroxyl polymer; 2) temperature of the fibrous structure during the thermal bonding operation; 3) pressure applied to the fibrous structure during the thermal bonding operation; 4) humidity at which the fibrous structure is subjected to during the thermal bonding operation; and 5) time (residence time) that the fibrous structure is at the temperature, under the pressure and/or at the humidity described above. For example, if temperature of the fibrous structure is increased, pressure may be decreased to obtain thermal bonding of a fibrous structure comprising polymer structures of the present invention, in one case such that the fibrous structure meets the CETM factor and/or CETM*$L^2$ factor of the present invention. The conditions at which thermal bonding of a fibrous structure according to the present invention may occur, in one case such that the fibrous structure meets the CETM factor and/or CETM*$L^2$ factor, can be empirically derived by experimentation.

For example, at a given level of Tg modifying agent (such as polyvinyl alcohol hydroxyl polymer), the temperature of the fibrous structure may need to be increased or decreased and/or the pressure may need to be increased or decreased and/or the humidity may need to be increased or decreased and/or the time at which the fibrous structure is at the temperature, under the pressure and at the humidity may need to be increased or decreased.

In another example, at a given temperature of the fibrous structure, the level of Tg modifying agent (such as polyvinyl alcohol hydroxyl polymer) may need to be increased or decreased and/or the pressure may need to be increased or decreased and/or the humidity may need to be increased or decreased and/or the time at which the fibrous structure is at the temperature, under the pressure and at the humidity may need to be increased or decreased.

Similar scenarios would exist at a given pressure, at a given humidity and at a given time at which the fibrous structure is at the temperature, under the pressure and at the humidity may need to be increased or decreased.

In one example, the Tg of a fiber and/or one or more polymers (starch and polyvinyl alcohol hydroxyl polymer, for example) within the fiber which is present within a fibrous structure according to the present invention, is decreased or increased compared to the starting Tg based upon the level of polyvinyl alcohol hydroxyl polymer included in the fiber. For example, if 5% wt. of polyvinyl alcohol hydroxyl polymer is present in the fiber then the Tg of the fiber and/or one or more polymers within the fiber is increased. In contrast, if 20% wt. of polyvinyl alcohol hydroxyl polymer is present in the fiber then the Tg of the fiber and/or one or more polymers within the fiber is decreased. Therefore, the temperature at which the fibrous structure needs to be at in order for its fibers to be at a temperature above its fibers' Tg and/or one or more polymers' Tg depends upon the level of polyvinyl alcohol hydroxyl polymer present in the fibers.

For example, a polymer structure comprising a polyvinyl alcohol hydroxyl polymer and a starch hydroxyl polymer can be at any suitable temperature depending upon the conditions for the thermal bonding operation as discussed above. Non-limiting examples suitable temperatures of the polymer structure and/or polymers within the polymer structure for the thermal bonding operation include a temperature of from about 70° C. (158° F.) to about 400° C. (752° F.) and/or from about 80° C. (176° F.) to about 260° C. (500° F.) so long as the polymer structure and/or one or more polymers making up the polymer structure are at a temperature above its Tg during the thermal bonding operation, thus subjecting the polymer structure and/or one or more polymers making up the polymer structure to a temperature above its Tg. Depending on the materials within the polymer structure, some of the materials may burn and/or char at temperatures above a certain maximum. In another example, depending upon the materials present in the polymer structure, especially if the polymer structure has not been cured at the time of the thermal bonding operation, a temperature of the polymer structure of less than 170° C. (338° F.), and/or less than about 140° C. (285° F.) and/or less than about 104° C. (220° F.) and/or less than about 90° C. (194° F.) and/or even about 82° C. (180° F.), may be utilized to obtain thermal bonding. Accordingly, in one example the polymer structure, especially an uncured polymer structure, may exhibit a temperature of greater than about 70° C. (158° F.) and/or greater than about 80° C. (176° F.) and/or greater than about 90° C. (194° F.) and/or greater than about 104° C. (220° F.) and/or from about 70° C. (158° F.) to about 400° C. (752° F.) and/or from about 80° C. (176° F.) to about 260° C. (500° F.) and/or from about 104° C. (220° F.) to about 200° C. (392° F.) and/or from about from about 120° C. (248° F.) to about 200° C. (392° F.) and/or from about from about 140° C. (285° F.) to about 200° C. (392° F.) and/or from about from about 170° C. (338° F.) to about 200° C. (392° F.). Thermal bonding of uncured polymer structures may reduce the piling of the polymer structures and/or fibrous structures containing such polymer structures and/or sanitary tissue products comprising such polymer structures. In another example, if humidity, such as relative humidity in the range of 70 to 85% RH is present in combination with a lower temperature of the polymer structure, such as 110° C. (230° F.) to about 130° C. (266° F.), the polyvinyl alcohol hydroxyl polymer within a polymer structure may flow since the presence of the relative high humidity decreases the Tg of the polyvinyl alcohol hydroxyl polymer.

"Fused" as in "fused region" as used herein means that two or more physical structures, such as polymer structures, even more particularly hydroxyl polymer structures, such as hydroxyl polymer fibers, are physically and/or chemically combined into a unitary structure. In one example, a fused region may comprise two or more fibers that share common material between the fibers such that the two or more fibers form a unitary structure. In another example, a fused region may comprise two or more fibers that have an adhesive agent, such as an elastomeric agent (i.e., a latex), that binds the two or more fibers into a unitary structure.

"Unfused" as in "unfused region" as used herein means that two or more physical structures, such as polymer structures, even more particularly hydroxyl polymer structures, such as hydroxyl polymer fibers, are physically and chemically discrete from each other.

In one example, a fused region of a fibrous structure of the present invention exhibits a lower opacity value than an unfused region within the same fibrous structure.

In another example, a fused region of a fibrous structure of the present invention is present in the form of a non-random repeating pattern within the fibrous structure.

"CETM Factor" as used herein is the quotient of Initial Total Wet Tensile in grams/inch units divided by Dry Burst Energy in (grams$_{force}$×cm)/cm$^2$. The Initial Total Wet Tensile is measured according to the Initial Total Wet Tensile Test Method described herein. The Dry Burst Energy is measured according to the Dry Burst Energy Test Method described herein.

In one example, a fibrous structure in accordance with the present invention exhibits a CETM Factor of less than 20 and/or less than 19.5 and/or less than 19 and/or less than 18 and/or less than 17 and/or less than 16.

"CETM*L$^2$ Factor" as used herein is the product of CETM Factor×(Dry Lint Score)$^2$. The Dry Lint Score is measured according to the Dry Lint Score Test Method described herein. It has been surprisingly found that the dry lint score of the fibrous structures of the present invention is disproportionately important in determining whether the fibrous structures of the present invention and/or sanitary tissue products comprising such fibrous structures are acceptable to consumers.

In one example, a fibrous structure in accordance with the present invention exhibits a CETM*L$^2$ Factor of less than 950 and/or less than 900 and/or less than 850 and/or less than 800 and/or less than 700 and/or less than 500 and/or less than 300 and/or 150 and/or less than 100 and/or less than 60.

"Capillary Number" as used herein is a number representing the ratio of the viscous fluid forces to surface tension forces. Near the exit of a capillary die, if the viscous forces are not significantly larger than the surface tension forces, the fluid filament will break into droplets, which is commonly termed "atomization." The Capillary Number is calculated according to the following equation:

$$Ca = (\eta_s \cdot Q)/(\pi \cdot r^2 \cdot \delta)$$

where $\eta_s$ is the shear viscosity in Pascal·seconds measured at a shear rate of 3000 s$^{-1}$; Q is the volumetric fluid flow rate through capillary die in m$^3$/s; r is the radius of the capillary die in meters (for non-circular orifices, the equivalent diameter/radius can be used); and σ is the surface tension of the fluid in Newtons per meter.

"Caliper" as used herein means the macroscopic thickness of a sample. Caliper of a sample of fibrous structure according to the present invention is determined by cutting a sample of the fibrous structure such that it is larger in size than a load foot loading surface where the load foot loading surface has a circular surface area of about 3.14 in$^2$. The sample is confined between a horizontal flat surface and the load foot loading surface. The load foot loading surface applies a confining pressure to the sample of 15.5 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Hydroxyl Polymer Structure

The hydroxyl polymer structure of the present invention may comprise a first polymer and a second polymer, wherein one of the two polymers is inherently thermoplastic (a polymer that melts and/or flows without the need of a plasticizer when the polymer is imparted a temperature above its Tg). The other polymer may require a plasticizer, such as water, sorbitol, glycerine, polyols, such as polyethylene glycols, ethylene glycol, polyethylene glycol, urea, sucrose, and esters, and combinations thereof to permit it to melt and/or flow when the polymer is imparted a temperature above its Tg (i.e., a thermoplasticizable polymer). In one example, the first polymer and the second polymer are hydroxyl polymers. In another example, the first polymer and the second polymer are different classes of hydroxyl polymers, such as starch hydroxyl polymer and polyvinyl alcohol hydroxyl polymer. The polymers of the hydroxyl polymer structure may be crosslinkable via a crosslinking system to themselves and/or to the each other.

The hydroxyl polymer structure of the present invention can be produced by polymer processing, for example meltblowing, spun bonding, and/or rotary spinning, a polymer composition.

Polymer Composition

The polymer composition of the present invention may have a shear viscosity, as measured according to the Shear Viscosity of a Polymer Composition Measurement Test Method described herein, of from about 0.5 Pascal·Seconds to about 25 Pascal·Seconds and/or from about 1 Pascal·Seconds to about 25 Pascal·Seconds and/or from about 1.5 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 sec$^{-1}$ and at the processing temperature (50° C. to 100° C.). Additionally, the normalized shear viscosity of the polymer composition of the present invention, in one example, does not increase more than 1.3 times the initial shear viscosity value after 70 minutes and/or 2 times the initial shear viscosity value after 130 minutes when measured at a shear rate of 3,000 sec$^{-1}$ according to the Shear Viscosity Change Test Method described herein.

The polymer composition may have a temperature of from about 50° C. to about 100° C. and/or from about 65° C. to about 95° C. and/or from about 70° C. to about 90° C. when making fibers from the polymer composition. The polymer composition temperature is generally higher when making film and/or foam polymer structures, as described below.

The pH of the polymer composition may be from about 2.5 to about 9 and/or from about 3 to about 8.5 and/or from about 3.2 to about 8 and/or from about 3.2 to about 7.5.

In one embodiment, a polymer composition of the present invention may comprise from about 30% and/or 40% and/or 45% and/or 50% to about 75% and/or 80% and/or 85% and/or 90% and/or 95% and/or 99.5% by weight of the polymer composition of a hydroxyl polymer. In one example, the polymer composition may comprise at least 5% and/or at least 10% and/or at least 13% and/or at least 17% and/or at least 20% and/or at least 30% by weight of the polymer composition of an inherently thermoplastic polymer, such as polyvinyl alcohol hydroxyl polymer.

The hydroxyl polymer may have a weight average molecular weight greater than about 100,000 g/mol prior to crosslinking.

The polymer composition may exhibit a Capillary Number of at least 1 and/or at least 3 and/or at least 5 such that the polymer composition can be effectively polymer processed into a polymer structure, such as a fiber. In one example, the polymer composition exhibits a Capillary Number of from at least 1 to about 50 and/or at least 3 to about 50 and/or at least 5 to about 30. Further, the polymer composition may exhibit a pH of from at least about 4 to about 12 and/or from at least about 4.5 to about 11.5 and/or from at least about 4.5 to about 11.

A crosslinking system may be present in the polymer composition and/or may be added to the polymer composition before polymer processing of the polymer composition. Further, a crosslinking system may be added to the polymer structure after polymer processing the polymer composition.

The crosslinking system of the present invention may further comprise, in addition to the crosslinking agent, a crosslinking facilitator.

"Crosslinking agent" as used herein means any material that is capable of crosslinking a hydroxyl polymer within a polymer composition according to the present invention.

Nonlimiting examples of suitable crosslinking agents include polycarboxylic acids, imidazolidinones and other compounds resulting from alkyl substituted or unsubstituted cyclic adducts of glyoxal with ureas, thioureas, guanidines, methylene diamides, and methylene dicarbamates and derivatives thereof; and mixtures thereof.

"Crosslinking facilitator" as used herein means any material that is capable of activating a crosslinking agent thereby transforming the crosslinking agent from its unactivated state to its activated state.

Upon crosslinking the hydroxyl polymer, the crosslinking agent becomes an integral part of the polymer structure as a result of crosslinking the hydroxyl polymer as shown in the following schematic representation:

Hydroxyl polymer–Crosslinking agent–Hydroxyl polymer

The crosslinking facilitator may include derivatives of the material that may exist after the transformation/activation of the crosslinking agent. For example, a crosslinking facilitator salt being chemically changed to its acid form and vice versa.

Nonlimiting examples of suitable crosslinking facilitators include acids having a pKa of between 2 and 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Nonlimiting examples of suitable crosslinking facilitators include acetic acid, benzoic acid, citric acid, formic acid, glycolic acid, lactic acid, maleic acid, phthalic acid, phosphoric acid, succinic acid and mixtures thereof and/or their salts, such as their ammonium salts, such as ammonium glycolate, ammonium citrate, ammonium chloride and ammonium sulfate.

Additional nonlimiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate and ammonium xylene sulfonate.

In another embodiment, the crosslinking system of the present invention may be applied to a pre-existing form as a coating and/or surface treatment.

The polymer composition may comprise a) from about 30% and/or 40% and/or 45% and/or 50% to about 75% and/or 80% and/or 85% and/or 90% and/or 99.5% by weight of the polymer composition of one or more hydroxyl polymers; b) a crosslinking system comprising from about 0.1% to about 10% by weight of the polymer composition of a crosslinking agent; and c) from about 0% and/or 10% and/or 15% and/or 20% to about 50% and/or 55% and/or 60% and/or 70% by weight of the polymer composition of an external plasticizer e.g., water.

The polymer composition may comprise two or more different classes of hydroxyl polymers at weight ratios of from about 20:1 and/or from about 15:1 and/or from about 10:1 and/or from about 5:1 and/or from about 2:1 and/or from about 1:1 to about 1:20 and/or to about 1:15 and/or to about 1:10 and/or to about 1:5 and/or to about 1:2 and/or to about 1:1.

In one example, the polymer composition comprises from about 0.01% to about 20% and/or from about 0.1% to about 15% and/or from about 1% to about 12% and/or from about 2% to about 10% by weight of a first class of hydroxyl polymer, such as a polyvinyl alcohol hydroxyl polymer and from about 20% to about 99.99% and/or from about 25% to about 95% and/or from about 30% to about 90% and/or from about 40% to about 70% by weight of a second class of hydroxyl polymer, such as a starch hydroxyl polymer.

Nonlimiting Example of a Process for Making a Hydroxyl Polymer Structure

Any suitable process known to those skilled in the art can be used to produce the polymer composition and/or to polymer process the polymer composition and/or to produce the polymer structure of the present invention. Nonlimiting examples of such processes are described in published applications: EP 1 035 239, EP 1 132 427, EP 1 217 106, EP 1 217 107, WO 03/066942 and U.S. Pat. No. 5,342,225.

a. Making a Polymer Composition

In one example, a polymer composition according to the present invention, comprises a first class of polymers and a second class of polymers. The first class of polymers, which in this example comprises about 50:50 dry weight ratio of two different starches, comprises an acid thinned dent corn starch hydroxyl polymer (for example Eclipse® G—commercially available from A.E. Staley) and an ethoxylated corn starch hydroxyl polymer (for example Ethylex® 2035—commercially available from A.E. Staley) and the second class of polymers comprises a polyvinyl alcohol hydroxyl polymer (for example Celvol® 310—commercially available from Celanese). In addition to the hydroxyl polymers, the polymer composition comprises an alkaline agent, (for example sodium hydroxide), a cationic agent (for example Arquade® 12-37—commercially available from Akzo Nobel), a crosslinking system comprising a crosslinking agent as described herein, and a crosslinking facilitator (for example ammonium chloride). Further, the polymer composition comprises a plasticizer (for example water). A sufficient amount of water is added the polymer composition such that the polymer composition exhibits a Capillary Number of at least 1.

A polymer composition of the present invention may be prepared using a screw extruder, such as a vented twin screw extruder.

A barrel 10 of an APV Baker (Peterborough, England) twin screw extruder is schematically illustrated in FIG. 1A. The barrel 10 is separated into eight zones, identified as zones 1-8. The barrel 10 encloses the extrusion screw and mixing elements, schematically shown in FIG. 1B, and serves as a containment vessel during the extrusion process. A solid feed port 12 is disposed in zone 1 and a liquid feed port 14 is disposed in zone 1. A vent 16 is included in zone 7 for cooling and decreasing the liquid, such as water, content of the mixture prior to exiting the extruder. An optional vent stuffer, commercially available from APV Baker, can be employed to prevent the polymer composition from exiting through the vent 16. The flow of the polymer composition through the barrel 10 is from zone 1 exiting the barrel 10 at zone 8.

Figure 1B:
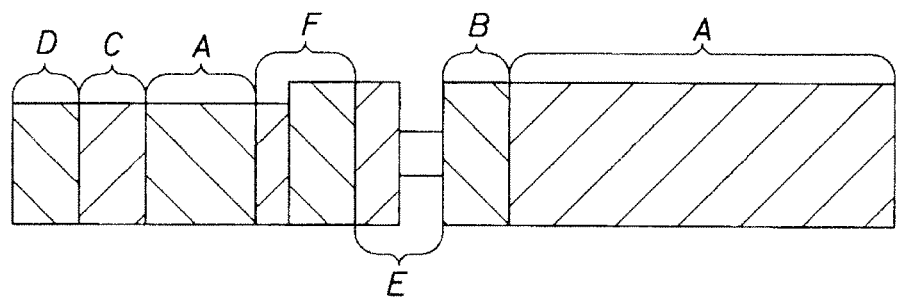
FIG. 1B is a schematic side view of a screw and mixing element configuration suitable for use in the barrel of FIG. 1A.

A screw and mixing element configuration for the twin screw extruder is schematically illustrated in FIG. 1B. The twin screw extruder comprises a plurality of twin lead screws (TLS) (designated A and B) and single lead screws (SLS) (designated C and D) installed in series. Screw elements (A-D) are characterized by the number of continuous leads and the pitch of these leads.

A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and SLS. Screw element A is a TLS with a 1.0 pitch and a 1.5 length ratio. Screw element B is a TLS with a 1.0 pitch and a 1.0 L/D ratio. Screw element C is a SLS with a ¼ pitch and a 1.0 length ratio. Screw element D is a SLS and a ¼ pitch and a ½ length ratio.

Bilobal paddles, E, serving as mixing elements, are also included in series with the SLS and TLS screw elements in order to enhance mixing. Various configurations of bilobal paddles and reversing elements F, single and twin lead screws threaded in the opposite direction, are used in order to control flow and corresponding mixing time.

In zone 1, a first hydroxyl polymer (for example dent corn starch) and/or first hydroxyl polymer composition (for example dent corn starch and an ethoxylated starch) is fed into the solid feed port at a rate of 183 grams/minute using a K-Tron (Pitman, N.J.) loss-in-weight feeder. A second hydroxyl polymer and/or second hydroxyl polymer composition is fed into the same port via a second K-tron feeder at a rate of 38 grams/minute.

Optionally the second hydroxyl polymer and/or second hydroxyl polymer composition may be prepared separately and added as a water-based polymer composition according to the following procedure. The second hydroxyl polymer and/or second hydroxyl polymer composition is prepared in a scraped wall reaction vessel (Chemplant Stainless Holdings Ltd. Dalton, England). The reaction vessel is capable of heating through an oil jacket and may be pressurized to prevent water loss at elevated temperatures. Water, an external plasticizer, is introduced into the vessel and while stirring the second hydroxyl polymer (for example polyvinyl alcohol) is added, optionally another hydroxyl polymer (for example an ethoxylated starch) may also be added during this step. Additional components such as surfactants or alkaline materials such as sodium/ammonium hydroxide may be added. The additive port of the reaction vessel is then closed, sealed and pressurized to 20 psi. The reaction vessel is then heated to about 110° C. while stirring for approximately one hour and then is pressure fed through supply lines to a B9000 pump (available from Zenith, a Division of Parker Hannafin) for metered feeding into the zone 1 of the extruder, as previously described. Adjustments are made to the feed rates to keep the total polymer addition to about 220 grams/minute and the water to about 136 grams/minute.

The first hydroxyl polymer and/or first hydroxyl polymer composition and the second hydroxyl polymer and/or second hydroxyl polymer composition are combined inside the extruder (zone 1) with the water, an external plasticizer, added at the liquid feed at a rate of 136 grams/minute using a Milton Roy (Ivyland, Pa.) diaphragm pump (1.9 gallon per hour pump head) to form a third hydroxyl polymer composition. The third hydroxyl polymer composition is then conveyed down the barrel of the extruder and cooked, in the presence of an alkaline agent, such as ammonium hydroxide and/or sodium hydroxide. (introduction of external plasticizer such as glycerin) The cooking causes a hydrogen from at least one hydroxyl moiety on one or more of the hydroxyl polymers to become disassociated from the oxygen atom of the hydroxyl moiety and thus creates a negative charge on the oxygen atom of the former hydroxyl moiety. This oxygen atom is now open for substitution by a substitution agent, such as a cationic agent, such as a quaternary ammonium compound, for example a quaternary amine.

Table 1 describes the temperature, pressure, and corresponding function of each zone of the extruder.

TABLE 1

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

After the third hydroxyl polymer composition exits the extruder, part of the polymer composition can be dumped and another part (100 g) can be fed into a Zenith®, type PEP II (Sanford N.C.) and pumped into a SMX style static mixer (Koch-Glitsch, Woodridge. Ill.). The static mixer is used to combine additional additives such as crosslinking agents, crosslinking facilitators, external plasticizers, such as water, with the third hydroxyl polymer composition. The additives are pumped into the static mixer via PREP 100 HPLC pumps (Chrom Tech, Apple Valley Minn.). These pumps provide high pressure, low volume addition capability. The third hydroxyl polymer composition of the present invention exhibits a Capillary Number of at least 1 and thus, is ready to be polymer processed into a polymer structure.

b. Polymer Processing the Polymer Composition into a Polymer Structure

The polymer processable hydroxyl polymer composition is then polymer processed into a hydroxyl polymer structure, such as a fiber. Nonlimiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, continuous fiber producing and/or tow fiber producing. Fiber spinning may be dry spinning or wet spinning. Polymer structures produced as a result of polymer processing of a polymer composition in accordance with the present invention may be combined, such as when the polymer structures are in the form of fibers, into a fibrous structure by collecting a plurality of the fibers onto a belt or fabric.

A polymer structure and/or fibrous structure of the present invention may then be post-processed by subjecting the web to a post-processing operation. Nonlimiting examples of post processing operations include curing, embossing, thermal bonding, humidifying, perfing, calendering, printing, differential densifying, tuft deformation generation, and other known post-processing operations.

c. Post-Processing the Fibrous Structure

Figure 2:
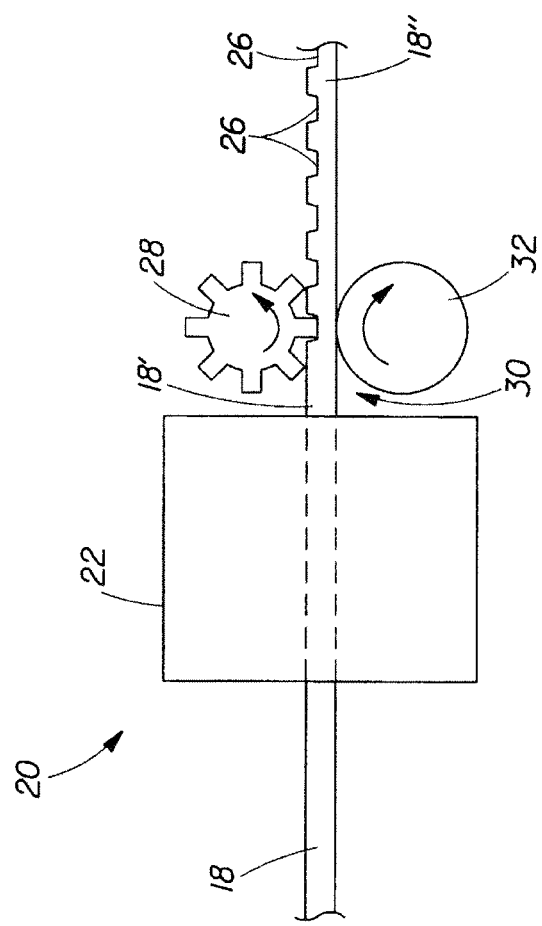
FIG. 2 is a schematic representation of a process for making a fibrous structure in accordance with the present invention.

As shown in FIG. 2, in one example, a fibrous structure 18 formed by processing the polymer composition according to the present invention into a plurality of fibers is subjected to a post-processing operation 20.

The fibrous structure 18 of the present invention may be cured during a curing operation 22 during which the fibrous structure 18 exhibits a temperature of from about 110° C. to about 260° C. and/or from about 110° C. to about 240° C. and/or from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. In one example, the curing operation 22 comprises passing the fibrous structure 18 over curing plates (not shown) set at about 135° C. to about 155° C. Alternative curing operations include radiation methods such as UV, e-beam, IR and other temperature-raising methods.

It has been found that time (i.e., residence time—the length of time that the fibrous structure is imparted a temperature capable of curing the fibrous structure and/or materials within the fibrous structure) and the curing temperature can be adjusted. For example, if the fibrous structure is at a temperature suitable for curing for a relatively long period of time, then a lower curing temperature may be used to obtain curing. However, if the fibrous structure is at a temperature suitable for curing for a relatively short period of time, then a higher curing temperature may need to be used to obtain curing.

In addition to the curing operation 22, the fibrous structure 18 may be thermally bonded during a thermal bonding operation 24. The thermal bonding operation 24 may occur prior to, simultaneous with and/or after the curing operation 22. During the thermal bonding operation 24, the cured fibrous structure 18' is imparted properties including a temperature above the Tg of at least one of the polymers within the polymer structure, especially within the polymer structure fiber within the fibrous structure 18'. In one example, the conditions include imparting to the fibrous structure 18' a temperature in the presence of humidity such that the temperature of the fibrous structure is above the Tg of at least one of the polymers of the polymer structure fiber within the fibrous structure 18'. In other words, the fibrous structure 18' is imparted a temperature with or without additional humidity in the range of from about 110° C. to about 200° C. and/or from about 120° C. to about 195° C. and/or from about 130° C. to about 185° C. During the thermal bonding operation 24, a physical pattern, such as a non-random repeating pattern, of discrete thermally bonded regions 26, continuous network (not shown) or discontinuous network (not shown) may be created in the fibrous structure 18" as a result of the fibrous structure 18' contacting a pattern delivering object, such as a patterned roll 28. At the patterned roll 28, the fibrous structure 18' is subjected to a pressure of at least about 5 pounds/linear inch ("pli") and/or at least about 20 pli and/or at least about 50 pli and/or at least about 200 pli and/or at least about 250 pli and/or at least about 300 pli. In one example, the fibrous structure 18' is subjected to a pressure of at least about 350 pli. In one example, the fibrous structure 18' travels through a nip 30 created by a patterned roll 28 and an anvil roll 32 with a 0 mils gap.

In another example (not shown), a physical pattern may be created in the fibrous structure as a result of contacting the fibrous structure with an adhesive agent, such as latex, in a physical pattern of discrete regions, continuous network and/or discontinuous network. Delivery of the adhesive agent onto the fibrous structure may be performed by any suitable means, such as by slot extrusion, gravure roll printing, ink jet printing and other suitable means known in the art. During the contacting of the adhesive agent to the fibrous structure, the fibrous structure may be imparted an appropriate temperature for thermal bonding as described above concurrently and/or subsequent to the adhesive agent coming into contact with the fibrous structure.

Figure 3:
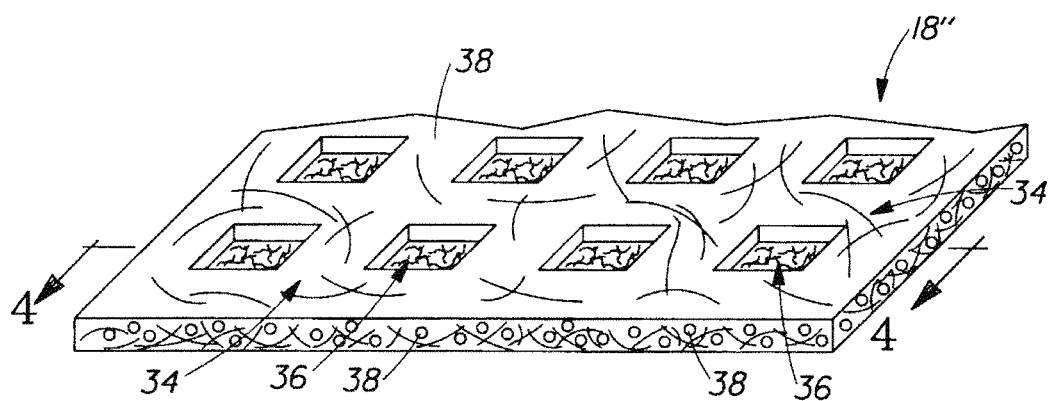
FIG. 3 is a schematic representation of a fibrous structure in accordance with the present invention.

After the fibrous structure has been subjected to a thermal bonding operation, the fibrous structure, as shown in FIG. 3 comprises an unfused region 34 and a fused region 36, which corresponds to the thermally bonded regions 26 created in the fibrous structure during the thermal bonding operation as shown in FIG. 2.

Figure 4:
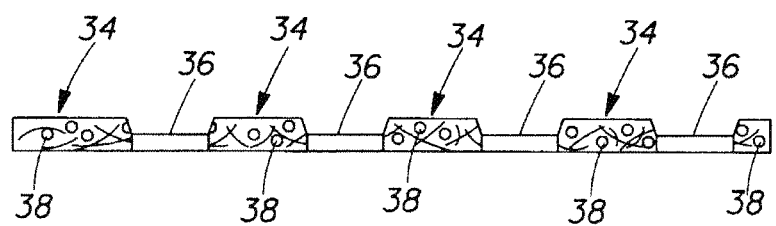
FIG. 4 is a schematic cross-sectional representation of the fibrous structure of FIG. 3 taken along line 4-4.

As shown in FIGS. 3 and 4, a thermally bonded fibrous structure 18" comprises an unfused region 34 and a fused region 36.

Figure 5A:
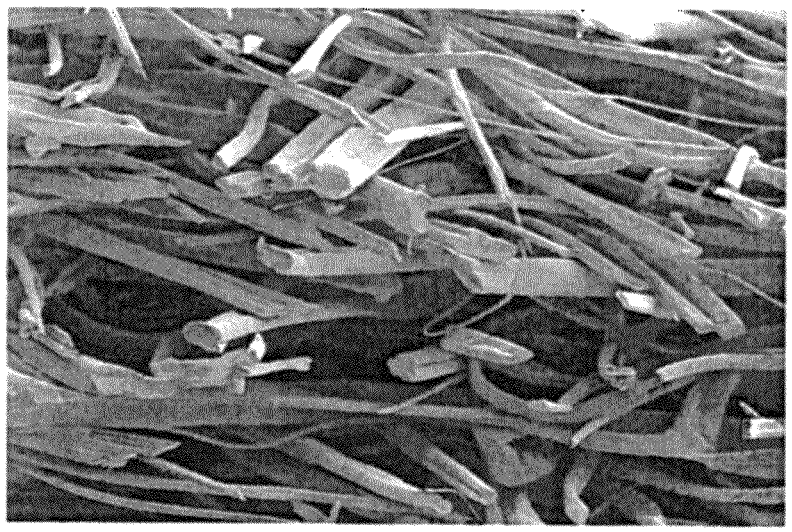
FIG. 5A is a scanning electron microscope photograph of an unfused region of a fibrous structure in accordance with the present invention.

As shown in FIG. 5A, a scanning electron microscope photograph showing a cross section of an unfused region 34 of a fibrous structure 18" of the present invention, the unfused region 34 comprises separate, discrete fibers 38.

Figure 5B:
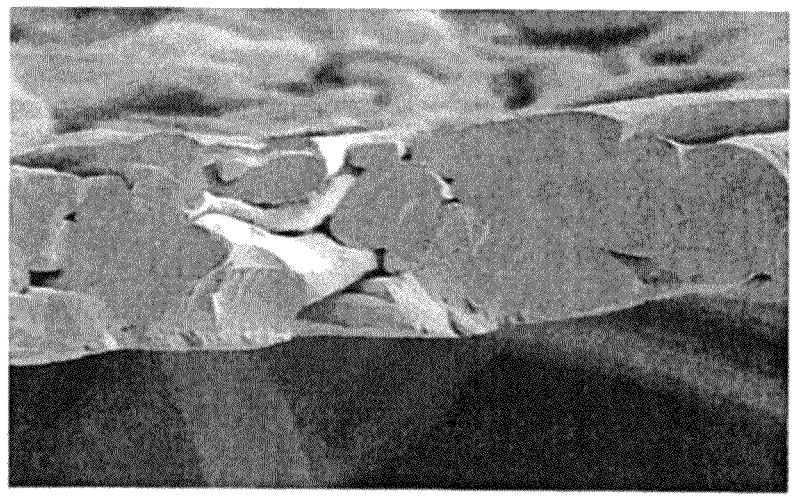
FIG. 5B is a scanning electron microscope photograph of a fused region of a fibrous structure in accordance with the present invention.

As shown in FIG. 5B, a scanning electron microscope photograph showing a cross section of a fused region 36 of a fibrous structure 18" of the present invention, the absence of separate, discrete fibers as shown in FIG. 5A, is evidenced in the fused region 36. Even though some of the fused regions may have some separate, discrete fibers, especially in the case of less than perfect thermal bonding operation conditions, the fact that some of the fibers within the fibrous structure are fused together into a unitary structure evidences a fused region and/or a transition region between an unfused region and a fused region.

Once a fibrous structure 18" has been subjected to a thermal bonding operation, the fibrous structure 18" may be subjected to additional post-processing operations in order to improve additional physical properties of the fibrous structure 18". Nonlimiting examples of these additional physical properties include softness, appearance, linting and/or pilling.

Figure 6:
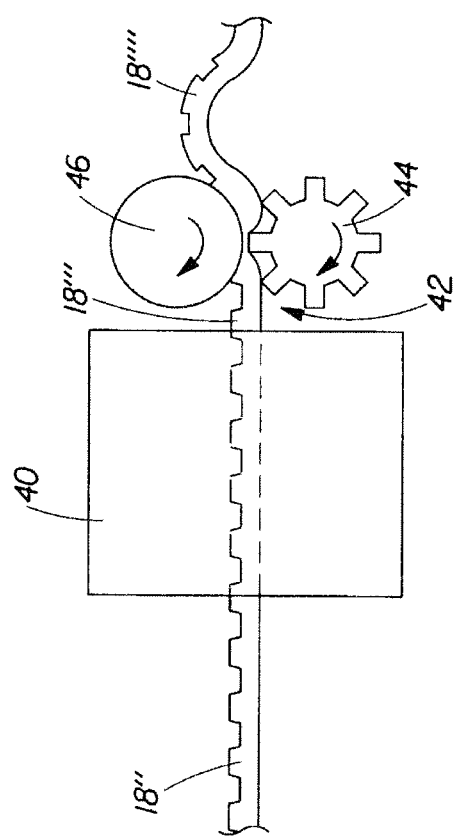
FIG. 6 is a schematic representation of a process for making a fibrous structure in accordance with the present invention.

As shown in FIG. 6, nonlimiting examples of additional post-processing operations include subjecting the fibrous structure 18" to a hyperbaric deflection process and/or an embossing process, such as a heated embossing process. In one example, the fibrous structure 18''' must contain enough moisture to permit deformation of the fibrous structure 18''' without tearing the fibrous structure 18''' during the post-processing operation. In one example, the fibrous structure 18''' comprises from about 8% to about 20% and/or from about 10% to about 18% and/or from about 12% to about 17% and/or from about 14% to about 16% surface moisture as measured by IR. One means of ensuring appropriate moisture within the fibrous structure 18''' is by passing the fibrous structure 18''' through a humidity chamber 40 at about 85% relative humidity and 110° C. to 120° C. A vacuum box can pull moisture through the web. The humidity from the humidity chamber 40 plasticizes the fibrous structure 18''' to produce a plasticized fibrous structure 18'''. When the plasticized fibrous structure 18''' exits the humidity chamber 40, the plasticized fibrous structure 18''' then passes through a nip 42 formed by a patterned embossing roll 44 and a rubber roll 46 at a nip pressure of at least about 1 pli and/or at least about 5 pli and/or at least about 10 pli and/or at least about 20 pli to form fibrous structure 18''''. In addition to contacting the rubber roll 46, the fibrous structure 18''' may contact a heated anvil roll (not shown) while the fibrous structure 18''' is still in contact with the patterned embossing roll 44. The heated anvil roll is heated from about 30° C. to about 200° C. and/or from about 35° C. to about 180° C. and/or from about 40° C. to about 140° C. and/or from about 40° C. to about 125° C. For example, heating the anvil roll to about 66° C. gives the anvil roll surface a temperature of about 40° C. The nip pressure between the patterned embossing roll 44 and the anvil roll, when present, is at least about 1 pli and/or at least about 5 pli and/or at least about 10 pli and/or at least about 20 pli.

In another example, the fibrous structure, even in the absence of being subjected to a thermal bonding operation, may exhibit a humidity, which may be imparted to the fibrous structure as a result of a humidity chamber as described above, and may exhibit a temperature above the Tg (for example above about 60° C.) of at least one of the hydroxyl polymers within the hydroxyl polymer fibers of the fibrous structure while the fibrous structure is imparted a pattern via a patterned belt an a rubber roll or anvil roll to impart a pattern to the fibrous structure. The resulting fibrous structure may have a CETM*$L^2$ Factor that is less than 950.

Additional post-processing operations may be performed on the fibrous structure, such as tuft-generating processes, printing processes, chemical softening processes, folding processes, calendaring processes and the like.

After post-processing the fibrous structure, the fibrous structure can then be wound on cores or wound without cores.

Two or more plies of the fibrous structure may be combined, with or without ply bond glue, to form a multi-ply sanitary tissue product.

As shown in FIG. 7, a fibrous structure 18 (Stage A) is post-processed by subjecting the fibrous structure 18 to a curing operation and subsequently to a thermal bonding operation to produce a thermally bonded fibrous structure 18'' (Stage B). The thermally bonded fibrous structure 18'' (Stage B) is then further post-processed by subjecting the fibrous structure 18'' (Stage B) to a humidity chamber and subsequently to a hyperbaric deflection operation to produce fibrous structure 18''' (Stage C). Substantially contemporaneous (simultaneously or substantially simultaneously) with the hyperbaric deflection operation, the fibrous structure 18''' (Stage D) may be contacted by a heated anvil roll to produce fibrous structure 18''''.

NONLIMITING EXAMPLES

Example 1

A two-ply sanitary tissue product comprising two individually formed about 24 gsm fibrous structures that is made from a polymer composition comprising 17% polyvinyl alcohol, 34.3% Eclipse G starch, 36.3% Ethylex 2035 starch, 0.7% Arquad® 12-37, 0.65% ammonium hydroxide, 3.95% ammonium chloride and 7.4% crosslinking agent. The fibrous structures are prepared according to the present invention wherein each fibrous structure is subjected to a thermal bonding operation and are cured simultaneous with the thermal bonding operation or are cured later in the process. After each fibrous structure is subjected to the thermal bonding operation, the fibrous structures are married to one another to form a 2-ply fibrous structure and are humidified. After humidification, the 2-ply fibrous structure is then subjected to a hyperbaric deflection process and then a heated emboss process. After and/or during the heated emboss process the 2-plies are heat sealed together and then wound up to form the 2-ply sanitary tissue product. The 2-ply sanitary tissue product exhibits an ITWT of 89.9 g/inch, a Dry Burst Energy of 4.84 (grams$_{force}$×cm)/cm$^2$ and a Dry Lint Score of 1.5. Therefore, the 2-ply sanitary tissue product exhibits a CETM Factor of 15.24 and a CETM*$L^2$ Factor of 35.98.

Example 2

A single-ply sanitary tissue product comprising one about 48 gsm fibrous structure that is made from the polymer composition of Example 1. The fibrous structure is prepared as described in Example 1 except that the fibrous structure is not married to another fibrous structure and thus, is not heat sealed. The single-ply sanitary tissue product exhibits an ITWT of 89.9 g/inch, a Dry Burst Energy of 5.9 (grams$_{force}$×cm)/cm$^2$ and a Dry Lint Score of 2.3. Therefore, the single-ply sanitary tissue product exhibits a CETM Factor of 15.24 and a CETM*$L^2$ Factor of 80.61.

Example 3

A Comparative Example of a single-ply sanitary tissue product that does not exhibit a CETM Factor nor a CETM*$L^2$ Factor within the scope of the present invention. The single-ply sanitary tissue product comprises one about 49 gsm fibrous structure made from a polymer composition comprising 90% Penfilm 162 starch (available from Penford), 10% Caliber182 (available from Cargill), 3.6% crosslinking agent, 0.7% ammonium citrate and 1.7% DL233 modified latex (available from The Dow Chemical Company). The fibrous structure is according to the present invention. However, unlike Examples 1 and 2, the fibrous structure is not subjected to a thermal bonding operation, rather the fibrous structure is humidified at room temperature (about 73° F.±4° F. (about 23° C.±2.2° C.)) and pressed into a patterned belt to impart a pattern to the fibrous structure. The fibrous structure is then wound up. The single-ply sanitary tissue product exhibits an ITWT of 37.7 g/inch, a Dry Burst Energy of 1.13 (grams$_{force}$×cm)/cm$^2$ and a Dry Lint Score of 7.5. Therefore, the single-ply sanitary tissue product exhibits a CETM Factor of 33.36 and a CETM*$L^2$ Factor of 1876.50.

Example 4

A single-ply sanitary tissue product comprising one about 49 gsm fibrous structure that is made from the polymer composition of Example 1. The fibrous structure is prepared without being subjected to a thermal bonding operation and/or a hyperbaric deflection process nor a heated emboss process, rather the fibrous structure is subjected to a humid consolidation process which humidifies the fibrous structure, subjects the fibrous structure to a temperature above the Tg of the polyvinyl alcohol and imparts a pattern to the fibrous structure. The fibrous structure is then embossed via steel-to-steel emboss rolls. The single-ply sanitary tissue product exhibits an ITWT of 103.3 g/inch, a Dry Burst Energy of 3.1 (grams$_{force}$×cm)/cm$^2$ and a Dry Lint Score of 5. Therefore, the single-ply sanitary tissue product exhibits a CETM*L$^2$ Factor of 833.

Test Methods

Unless otherwise indicated, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 24 hours prior to the test. Further, all tests are conducted in such conditioned room. Tested samples and felts should be subjected to 73° F.±4° F. (about 23° C.±2.2° C.) and a relative humidity of 50%±10% for 24 hours prior to testing.

A. Initial Total Wet Tensile Test Method

The initial total wet tensile of polymer structures and/or fibrous structures and/or sanitary tissue products of the present invention is determined using a Thwing-Albert EJA Material Tester Instrument, Cat. No. 1350, equipped with 5000 g load cell available from Thwing-Albert Instrument Company, 14 Collings Ave. W. Berlin, N.J. 08091. 10% of the 5000 g load cell is utilized for the wet tensile test.

i. Sample Preparation—A strip of sample to be tested [2.54 cm (1 inch) wide by greater than 5.08 cm (2 inches) long is obtained.

ii. Operation—The test settings for the instrument are:
Crosshead speed—10.16 cm/minute (4.0 in/minute)
Initial gauge length—2.54 cm (1.0 inch)
Adjust the load cell to read zero plus or minus 0.5 grams$_{force}$.

iii. Testing Samples—One end of the sample strip is placed between the upper jaws of the machine and clamped. After verifying that the sample strip is hanging straight between the lower jaws, clamp the other end of the sample strip in the lower jaws.

a. Pre-Test—Strain the sample strip to 25 grams$_{force}$ (+/−10 grams$_{force}$) at a strain rate of 3.38 cm/minute (1.33 in/minute) prior to wetting the sample strip. The distance between the upper and lower jaws now being greater than 2.54 cm (1.0 inch). This distance now becomes the new zero-strain position for the forthcoming wet test.

b. Wet Test—While the sample strip is still at 25 grams$_{force}$ (+/−10 grams$_{force}$), it is wetted, starting near the upper jaws, a water/0.1% Pegosperse® ML200 (available from Lonza Inc. of Allendale, N.J.) solution [having a temperature of about 73° F.±4° F. (about 23° C.±2.2° C.)] is delivered to the sample strip via a 2 ml disposable pipet. Do not contact the sample strip with the pipet and do not damage the sample strip by using excessive squirting pressure. The solution is continuously added until the sample strip is visually determined to be completely saturated between the upper and lower jaws. At this point, the load cell is re-adjusted to read zero plus or minus 0.5 grams$_{force}$.

The sample strip is then strained at a rate of 10.16 cm/minute (4 inches/minute) and continues until the sample strip is strained past its failure point (failure point being defined as the point on the force-strain curve where the sample strip falls to 50% of its peak strength after it has been strained past its peak strength). The straining of the sample strip is initiated between 5-10 seconds after the sample is initially wetted. The initial result of the test is an array of data points in the form of load (grams$_{force}$) versus strain (where strain is calculated as the crosshead displacement (cm of jaw movement from starting point) divided by the initial separation distance (cm) between the upper and lower jaws after the pre-test.

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

$$ITWT\ (g_f/\text{inch}) = \text{Peak Load}_{MD}\ (g_f)/1\ (\text{inch}_{width}) + \text{Peak Load}_{CD}\ (g_f)/1\ (\text{inch}_{width})$$

The ITWT value as used herein is the normalized ITWT value calculated as follows:

$$\text{Normalized}\ \{ITWT\} = \{ITWT\} * 50\ (g/m^2)/\text{Basis Weight of Strip}\ (g/m^2).$$

B. Dry Burst Energy Test Method

The dry burst energy of polymer structures and/or fibrous structures and/or sanitary tissue products of the present invention is determined using a Thwing-Albert EJA Material Tester Instrument, Cat. No. 1350, equipped with 2000 g load cell, and ⅝ inch diameter stainless steel plunger available from Thwing-Albert Instrument Company, 14 Collings Ave. W. Berlin, N.J. 08091.

i. Sample Preparation—A strip of sample to be tested [11.43 cm (4.5 inches) wide by 25.4 cm (10 inches)] long is obtained. The sample strip should have an untainted circular-shaped portion that is larger in area (greater than 65 m$^2$) than the circular area inside of the sample holder rings (62.1 cm$^2$) of the apparatus. "Untainted" as used herein means that the portion does not have perforations or significantly more pin-holes than other portions of the sample strip nor does it have any tape and/or adhesive present on the surface of the portion of the sample strip. Do not stretch, wrinkle, or overly handle the sample strip, especially in the portion of the sample strip that will be contacted by the plunger.

ii. Operation—The test settings for the instrument are:
Plunger Speed—12.7 cm/minute
Plunger Acceleration—12 cm/second$^2$
Inner Diameter of Sample Holder Rings—8.89 cm
Sample Data Acquisition Rate—80 data points/second
Adjust the load cell to read zero plus or minus 1 grams$_{force}$.

In order to move the plunger to the correct zero base position, place a flat, metal ruler or plate in the sample test position (where a sample normally would go), then use the up and down control buttons to position the plunger just below where it touches the ruler. Watch the load cell reading to signal when the ruler is in contact with the plunger. Lower the plunger in 0.01 cm increments until the load cell reading returns to zero level, then set this position as the new zero position.

Prior to operation, the instrument load cell calibration is verified using a 50 gram weight. Be sure nothing abnormal is touching the plunger and load cell, then zero the load cell reading. Carefully place the 50 gram weight on top the plunger. Record the load cell reading into the appropriate log sheet in the binder. If outside the acceptable range, discontinue testing and contact the lab owner and/or Thwing-Albert Company for recalibration.

iii. Testing Samples—Place the sample on the lower ring of the sample holding device with the outer surface of the product facing up, so the sample completely covers the open surface of the sample holding ring and a small amount of sample extends out to the sides of the solid metal surface. If perforations are present, be sure that they are outside the open center-area of the ring. After the sample strip is properly in place on the lower ring, lower the upper ring of the pneumatic holding device. The sample to be tested is now securely gripped in the sample holding unit.

Push the START button. The plunger will begin to rise. At some point, the sample will begin to tear or "burst". NOTE: In unusual cases, because of very high sample stretch, the sample may not burst within the given test unit's range of capability. Report these cases with notation "Did Not Burst".

After the plunger reaches its maximum elevation, it will automatically reverse and return to its original position. After the plunger has returned to its original position, raise the upper ring, and remove the tested sample portion. Another sample strip portion is placed on the lower ring of the sample holding assembly and clamped in place. This sequence is continued until four testable portions of a particular sample strip have been tested. NOTE: During a series of tests, the instrument ZERO should be checked—adjust accordingly if outside the acceptable range of 0±1 gram.

iv. Calculations—Dry Burst Energy is calculated by calculating the area under the force versus plunger displacement curve (from 0 displacement to peak load displacement point) created by the data captured by the instrument for a sample tested divided by the total sample area inside the circular-shaped clamp (62.1 cm$^2$). Dry Burst Energy is reported to the nearest 0.01 (grams$_{force}$*cm)/cm$^2$. The four values obtained from one sample strip are averaged to give the reported value.

C. Lint/Pilling Test Method i. Sample Preparation—Sample strips (a total of 4 if testing both sides, 2 if testing a single side) of fibrous structures and/or sanitary tissue products, which do not have abraded portions) 11.43 cm (4.5 inch) wide×30.48 cm to 40.64 cm (12-16 inch) long such that each sample strip can be folded upon itself to form a 11.43 cm (4.5 inch) wide (CD) by 10.16 cm (4.0 inch) long (MD) rectangular implement having a total basis weight of between 140 to 200 g/m$^2$ are obtained and conditioned according to Tappi Method #T402OM-88. For both side testing, makeup two rectangular implements as described above with a first side out and then two rectangular implements with the other side out (keep track of which are which).

For sanitary tissue products formed from multiple plies of fibrous structure, this test can be used to make a lint measurement on the multi-ply sanitary tissue product, or, if the plies can be separated without damaging the sanitary tissue product, a measurement can be taken on the individual plies making up the sanitary tissue product. If a given sample differs from surface to surface, it is necessary to test both surfaces and average the scores in order to arrive at a composite lint score. In some cases, sanitary tissue products are made from multiple-plies of fibrous structures such that the facing-out surfaces are identical, in which case it is only necessary to test one surface.

Each sample is folded upon itself to make a 4.5" CD×4" MD sample. For two-surface testing, make up 3 (4.5" CD×4" MD) samples with a first surface "out" and 3 (4.5" CD×4" MD) samples with the second surface "out". Keep track of which samples are first surface "out" and which are second surface "out".

For a dry lint/pilling test, obtain a 30"×40" piece of Crescent #300 cardboard from Cordage Inc. (800 E. Ross Road, Cincinnati, Ohio, 45217). Using a paper cutter, cut out six pieces of cardboard of dimensions of 6.35 cm×15.24 cm (2.5 inch×6 inch). Puncture two holes into each of the six pieces of cardboard by forcing the cardboard onto the hold down pins of the Sutherland Rub tester. Center and carefully place each of the cardboard pieces on top of the previously folded samples with the tested side exposed outward. Make sure the 15.24 cm (6 inch) dimension of the cardboard is running parallel to the machine direction (MD) of each of the folded samples. Fold one edge of the exposed portion of the sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the sample onto the cardboard, tape this second edge to the back of the cardboard. Repeat this procedure for each sample. Turn over each sample and tape the cross direction edges of the sample to the cardboard. One half of the adhesive tape should contact the sample while the other half is adhering to the cardboard. Repeat this procedure for each of the samples. If the sample breaks, tears, or becomes frayed at any time during the course of this sample preparation procedure, discard and make up a new sample with a sample strip.

For a wet lint/pilling test, first prepare the testing surface by securely fastening a smooth surface foam pad (⅛" thick, Poron quick Recovery Foam, adhesive back, firmness rating 13), having a length greater than or equal to 15.24 cm (6 inch) and a width greater than or equal to 12.70 cm (5 inch), to a flat and level table surface, positioned in such a way that its ≧12.70 cm length direction is parallel to the table edge, and is flush with the table edge. On top of this foam surface, adhere a piece of fine grade sandpaper (12.70 cm×15.24 cm, using double-sided tape or glue), with its shorter axis parallel to the table edge, and centered with respect to other dimensions of the foam. Position the folded sample such that one of its CD-axis sides is 0-¼ inch from the from the table surface and foam/sandpaper edge. Adhere the opposite edge of the sample (using ≧8" length of Scotch brand ¾ inch transparent tape) with tape extending long enough to adhere to both sides of the table.

ii. Felt and Weight Component Preparation—Cut a piece of a black test felt (F-55 or equivalent from New England Gasket, 550 Broad Street, Bristol, Conn. 06010) to the dimensions of 2¼"×7¼". The felt is to be used in association with a weight. The weight may include a clamping device to attach the felt/cardboard combination to the weight. The weight and any clamping device total five (5) pounds. The weight is available from Danilee Company, San Antonio, Tex., and is associated with the Sutherland Rub Tester. The weight has a 2"×4" piece of smooth surface foam attached to its contact face (⅛" thick, Poron quick Recovery Foam, adhesive back, firmness rating 13). For the dry test, the felt is clamped directly against this foam surface, providing an effective contact area of 8 in$^2$ and a contact pressure of about 0.625 psi. For the wet test, an additional 1"×4" foam strip (same foam as described above) is attached and centered in the length direction on top the 2"×4" foam strip, thus, after clamping the felt against this surface, an effective contact area of 4 in$^2$ and a contact pressure of about 1.25 psi is established. Also, for the wet test only, after clamping the felt to weight apparatus, two strips of tape (4¼"-5¼" in length, Scotch brand ¾" width) are placed along each edge of the felt (parallel to the long side of the felt) on the felt side that will be contacting the sample. The untaped felt between the two tape strips has a width between 18-21 mm. Three marks are placed on one of the strips of tape at 0, 4 and 10 centimeters along the flat, test region of the test felt.

iii. Conducting Dry Lint/Pills Test—The amount of dry lint and/or dry pills generated from a fibrous product according to the present invention is determined with a Sutherland Rub Tester (available from Danilee Company, San Antonio, Tex.). This tester uses a motor to rub a felt/weight component 5 times (back and forth) over the fibrous product, while the fibrous product is restrained in a stationary position.

First, turn on the Sutherland Rub Tester pressing the "reset" button. Set the tester to run 5 strokes at the lower of the two speeds. One stroke is a single and complete forward and reverse motion of the weight. The end of the rubbing block should be in the position closest to the operator at the beginning and at the end of each test.

Place the sample/cardboard combination on the base plate of the tester by slipping the holes in the board over the hold-down pins. The hold-down pins prevent the sample from moving during the test. Hook the felt/weight combination into the tester arm of the Sutherland Rub Tester, and gently place it on top of the sample/cardboard combination. The felt must rest level on the calibration sample and must be in 100% contact with the calibration sample surface (use a bubble level indicator to verify). Activate the Sutherland Rub Tester by pressing the "start" button.

Keep a count of the number of strokes and observe and make a mental note of the starting and stopping position of the felt covered weight in relationship to the sample. If the total number of strokes is five and if the position of the calibration felt covered weight is the same at the end as it was in the beginning of the test, the test was successful performed. If the total number of strokes is not five or if the start and end positions of the felt covered weight are different, then the instrument may require servicing and/or recalibration.

Once the instrument is finished moving, remove the felt covered weight from the holding arm of the instrument, and unclamp the felt from the weight. Lay the test felt on a clean, flat surface.

iv. Conducting Wet Lint/Pills Test—Wet lint/pills are determined by pulling, during one pass, a partially wetted felt/weight component over a sample.

To wet the felt, pipette 0.6 ml of deionized water on to the felt, between the 0 and 4 cm marks, as represented on the tape attached to the felt. Before the water soaks into the felt, use a metal ruler with a width of ¾", to spread the water uniformly across the 0-4 cm marked wet zone without spilling onto the tape or into the dry zone (between the 4 and 10 cm marks).

After the water is uniformly distributed and fully penetrated into the felt (not beaded up at all), place weight-felt apparatus on the sample such that the felt wetted region is ≦¼" from the edge of sample and tape. After approximately one second, pull the knob horizontally until the apparatus is completely off the table—the pulling process should take 0.5 to 1.5 seconds. Pull the weight in a manner to avoid placing any additional force on the felt/weight component other than the horizontal pull force. The pulling process should occur as a substantially continuous or continuous motion. Record if sample sheet tears significantly due to felt rubbing, and/or if pieces fall off (onto floor) during the test.

Carefully remove the felt from the weight, store in a safe, flat place, and allow to dry before imaging (≧24 hours, standard conditions). Do not stack multiple layers of felt on top one another to prevent sticking and lint/pill transfer.

The next step is to complete image capture, analysis, and calculations on the test felts as described below.

vi. Image Capture—The images of the felt (untested), sample (untested) and felt (tested) are captured using a computer and scanner (Microtek ArtixScan 1800f). Be certain that scanner glass is clear and clean. Place felts centered on scanner, face down. Adjust image capture boundaries so that all felts are included into the captured image. Set-up the scanner to 600 dpi, RGB, and 100% image size (no scaling). After successfully imaging the felts, save the image as an 8-bit RGB TIFF image, remove felts from scanner, and repeat from process until all felts images are captured.

Additional images of the sample (untested) may need to be captured (in the same manner) if they have an average luminance (using Optimas software) significantly less than 254 (less than 244), after being converted to an 8-bit gray-scale image. Also, an image of a known length standard (e.g., a ruler) is taken (exposure difference does not matter for this image). This image is used to calibrate the image analysis software distance scale.

vii. Image Analysis—The images captured are analyzed using Optimas 6.5 Image Analysis software commercially available from Media Cybernetics, L.P. Imaging set-up parameters, as listed herein, must be strictly adhered to in order to have meaningfully comparative lint score and pill score results.

First, an image with a known length standard (e.g., a ruler) is brought up in Optimas, and used to calibrate length units (millimeters in this case). For dry testing, the region of interest (ROI) area is approximately 4500 mm2 (90 mm by 50 mm), and the wetted and dragged ROI area is approximately 1500 mm2 (94 mm by 16 mm). The exact ROI area is measured and recorded (variable name: ROI area). The average gray value of the unrubbed region of the test felt is used as the baseline, and is recorded for determining the threshold and lint values (variable name: untested felt GV avg). It is determined by creating a region of interest box (ROI) with dimensions approximately 5 mm by 25 mm on the untested, unrubbed area of the black felt, on opposite ends of the rubbed region. The average of these two average gray value luminaces for each of the ROI's is used as the untested felt GV average value for that particular test felt. This is repeated for all test felts analyzed. The test sheet luminance is typically near saturated white (gray value 254) and fairly constant for samples of interest. If believed to be different, measure the test sheet in a similar fashion as was done for the untested felt, and record (variable name=untested sheet GV avg). The luminance threshold is calculated based on the untested felt GV avg and untested sheet GV avg as follows:

For the dry lint/pilling test felts:

$$(untested\_sheet\_GV\_avg - untested\_felt\_GV\_avg) * 0.4 + untested\_felt\_GV\_avg$$

For the wet lint/pilling test felts:

$$(untested\_sheet\_GV\_avg - untested\_felt\_GV\_avg) * 0.25 + untested\_felt\_GV\_avg$$

The test felt image is opened, and the ROI and its boundaries are created and properly positioned to encompass a region that completely contains pills and contains the highest concentration of pills on the rubbed section of the test felt. The average luminance for the ROI is recorded (variable name: ROI GV avg). Pills are determined as follows: Optimas creates boundary lines in the image where pixel luminance values cross through the threshold value (e.g., if the threshold is 120, boundary lines are created where pixels of higher and lower value exist on either side. The criteria for determining a pill is that it must have an average luminance greater than the threshold value, and have a perimeter length greater than 0.5 mm. The sum of the pilled areas variable name is: Total Pilled Area.

Measurement data of the ROI, and for each pill is exported from Optimas to a spreadsheet for performing the following calculations.

viii. Calculations—The data obtained from the image analysis is used in the following calculations:

Pilled Area %=Percent of area covered by pilling=Total Pilled Area/ROI area

Lint Score=Gray value difference between unpilled area of the rubbed test felt area and the untested felt Lint Score=unpilled felt Gray Value avg−untested felt Gray Value avg where: unpilled felt Gray Value avg=[(ROI Gray Value avg*ROI area)−(pilled Gray Value avg*pilled area)]/Total Unpilled Area By taking the average of the lint score of the first-side surface and the second-side surface, the lint is obtained which is applicable to that particular web or product. In other words, to calculate lint score, the following formula is used:

$$\text{Dry Lint Score} = \frac{\text{Dry Lint Score, } 1^{st}\text{side} + \text{Dry Lint Score, } 2^{nd}\text{side}}{2}$$

$$\text{Dry Pill Area \%} = \frac{\text{Dry Pill Area \%, } 1^{st}\text{side} + \text{Dry Pill Area \%, } 2^{nd}\text{side}}{2}$$

$$\text{Wet Lint Score} = \frac{\text{Wet Lint Score, } 1^{st}\text{side} + \text{Wet Lint Score, } 2^{nd}\text{side}}{2}$$

$$\text{Wet Pill Area \%} = \frac{\text{Wet Pill Area \%, } 1^{st}\text{side} + \text{Wet Pill Area \%, } 2^{nd}\text{side}}{2}$$

D. Shear Viscosity of a Polymer Composition Measurement Test Method

The shear viscosity of a polymer composition of the present invention is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta=K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

E. Shear Viscosity Change Test Method

Viscosities of three samples of a single polymer composition of the present invention are measured by filling three separate 60 cc syringes; the shear viscosity of one sample is measured immediately (initial shear viscosity) (it takes about 10 minutes from the time the sample is placed in the rheometer to get the first reading) according to the Shear Viscosity of a Polymer Composition Measurement Test Method. If the initial shear viscosity of the first sample is not within the range of 5-8 Pascal·Seconds as measured at a shear rate of 3,000 sec$^{-1}$, then the single polymer composition has to be adjusted such that the single polymer composition's initial shear viscosity is within the range of 5-8 Pascal·Seconds as measured at a shear rate of 3,000 sec$^{-1}$ and this Shear Viscosity Change Test Method is then repeated. Once the initial shear viscosity of the polymer composition is within the range of 5-8 Pascal·Seconds as measured at a shear rate of 3,000 sec-1, then the other two samples are measured by the same test method after being stored in a convection oven at 80° C. for 70 and 130 minutes, respectively. The shear viscosity at 3000 sec$^{-1}$ for the 70 and 130 minute samples is divided by the initial shear viscosity to obtain a normalized shear viscosity change for the 70 and 130 minute samples.

F. Fiber Diameter Test Method

A polymer structure comprising fibers of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 µm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.3) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a fibrous structure comprising a hydroxyl polymer structure, wherein the fibrous structure comprises fused regions and exhibits a CETM*$L^2$ Factor of less than 950, the process comprising the steps of:
   a. providing a polymer composition comprising from about 30% to about 90% by weight of one or more hydroxyl polymers, from about 0.1% to about 10% by weight of a crosslinking agent, and from about 10% to about 70% by weight of water;
   b. producing a crosslinked hydroxyl polymer structure in the form of a fiber from the polymer composition;
   c. forming a fibrous structure comprising the hydroxyl polymer fiber;
   d. subjecting the fibrous structure to a thermal bonding operation such that the fibrous structure comprising fused regions and exhibiting a CETM*$L^2$ Factor of less than 950 is formed.

2. The process according to claim 1 wherein the hydroxyl polymer structure is produced by polymer processing a polymer composition comprising at least two different classes of hydroxyl polymers.

3. The process according to claim 2 wherein one of the at least two different classes of hydroxyl polymers comprises a thermoplasticizable hydroxyl polymer.

4. The process according to claim 3 wherein the thermoplasticizable hydroxyl polymer comprises a polysaccharide hydroxyl polymer.

5. The process according to claim 4 wherein the polysaccharide hydroxyl polymer comprises a starch hydroxyl polymer.

6. The process according to claim 2 wherein one of the at least two different class of hydroxyl polymers comprises an inherently thermoplastic hydroxyl polymer.

7. The process according to claim 6 wherein the inherently thermoplastic hydroxyl polymer comprises a polyvinyl alcohol hydroxyl polymer.

8. The process according to claim 1 wherein the process further comprises a step of subjecting the fibrous structure to a hyperbaric deflection process.

9. The process according to claim 2 wherein the step of subjecting the fibrous structure to a thermal bonding operation comprises imparting to the fibrous structure a temperature that is above the Tg of at least one of the hydroxyl polymers making up the hydroxyl polymer fiber.

10. The process according to claim 9 wherein the temperature is at least about 70° C.

* * * * *